United States Patent [19]

Tanzilli et al.

[11] Patent Number: 5,541,010
[45] Date of Patent: Jul. 30, 1996

[54] OPTICAL SOLAR REFLECTOR

[75] Inventors: Richard A. Tanzilli; Joseph J. Gebhardt, Malvern, both of Pa.

[73] Assignee: The United States of America as represented by the Secretary of the Air Force, Washington, D.C.

[21] Appl. No.: 534,871

[22] Filed: Aug. 23, 1993

[51] Int. Cl.⁶ ................................................. B32B 18/00
[52] U.S. Cl. ...................... 428/336; 428/469; 428/472; 428/457; 428/697; 428/698; 428/701; 428/702
[58] Field of Search ........................... 428/472, 698, 428/920; 343/18 B, 18 E

[56] References Cited

U.S. PATENT DOCUMENTS

| | | | |
|---|---|---|---|
| 3,592,942 | 7/1971 | Hauck et al. | 428/472 X |
| 3,671,286 | 6/1972 | Fischell | 117/333 |
| 4,124,732 | 11/1978 | Leger | 428/920 X |
| 4,268,562 | 5/1981 | Bacon et al. | 428/113 |
| 4,312,570 | 1/1982 | Southwell | 350/166 |
| 4,377,618 | 3/1983 | Ikeda et al. | 428/698 X |

*Primary Examiner*—Charles T. Jordan
*Assistant Examiner*—John R. Hardee
*Attorney, Agent, or Firm*—Charles E. Bricker; Thomas L. Kundert

[57] ABSTRACT

An optical solar reflector comprising a layer of silicon nitride having a reflective metallic coating on one side thereof and an optional dielectric coating on the opposite side.

5 Claims, 1 Drawing Sheet

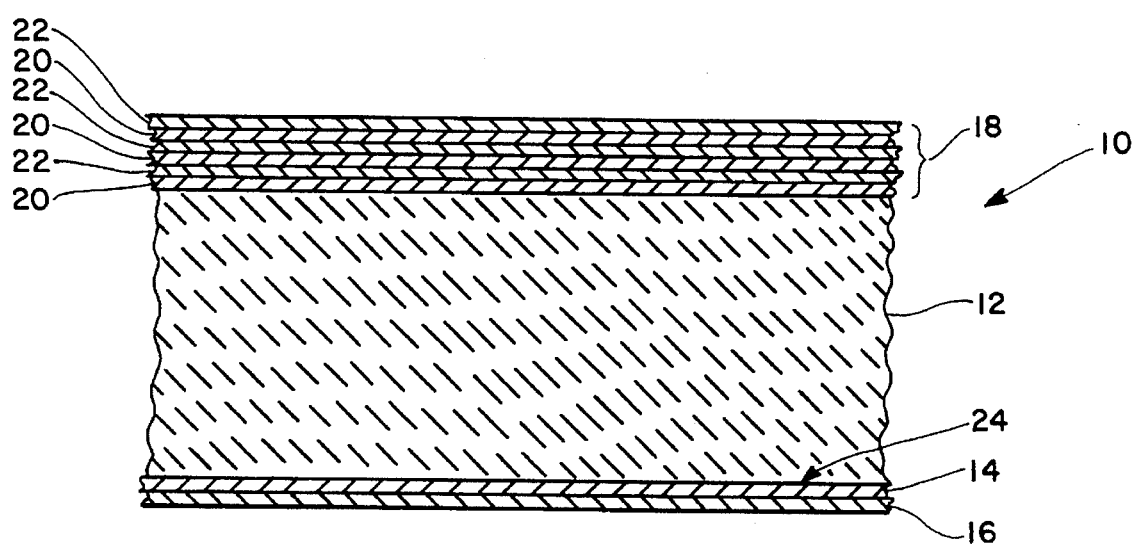

OPTICAL SOLAR REFLECTOR

RIGHTS OF THE GOVERNMENT

The invention described herein may be manufactured and used by or for the Government of the United States for all governmental purposes without the payment of any royalty.

BACKGROUND OF THE INVENTION

The present invention relates to optical solar reflectors for earth satellites.

Most satellites which operate in earth-o-bit require some form of environmental control to maintain a thermal balance between the satellite components and the extremes of the low temperature space background and the radiative flux from the sun. These satellites employ a variety of standard techniques including thermal control coatings, radiators and multilayer insulation (MLI) to achieve this thermal balance. These thermal control systems utilize a variety of materials depending upon application and configuration but they generally have similar properties of lightweight, low outgassing, and high UV stability. Consequently, most of the subsystems have not been designed with any need for very high temperature stability.

With the advent of ground and spaceborne High Energy Laser (HEL) threats, most of the standard materials and techniques commonly used become vulnerable to severe degradation resulting from the high flux and fluence levels. As a result, active and passive countermeasures such as evasive actions or higher temperature materials must be used to withstand or avoid this new environment.

A common technique for obtaining stable, low solar absorptivity to emissivity ratios ($\alpha_s/\epsilon$) has been the Optical Solar Reflector (OSR). Typical values of $\alpha_s/\epsilon$ are 0.08/0.8. The OSR are typically applied in tiles about 1 inch square, consisting of 6 to 8 mil of high purity fused silica as a substrate with a coating of silver on its rear surface to form a second surface mirror. The tiles are bonded to the radiator surface with an adhesive. Since the OSR has high emittance in the IR region of the spectrum, it inherently absorbs at a longer wavelength ($SiO_2$ absorbs very strongly beyond 5 μm and heats up rapidly when exposed to laser radiation in this region). Large differences in thermal expansions of silica and silver films cause delamination at the silica/silver interface.

It is therefore an object of the present invention to provide an improved Optical Solar Reflector (OSR).

Other objects, aspects and advantages of the present invention will be apparent to those skilled in the art.

SUMMARY OF THE INVENTION

In accordance with the present invention there is provided an improved Optical Solar Reflector (OSR) comprising a silicon nitride ($Si_3N_4$) tile having a reflecting metallic coating applied to its rear surface.

Also in accordance with the present invention there is provided an improved OSR comprising a transparent silicon nitride tile having a reflecting metallic coating on its rear surface and having a reflectivity enhancement coating on its front surface.

BRIEF DESCRIPTION OF THE DRAWING

In the drawing, the FIGURE is a cross-sectional view of the improved OSR of this invention.

DETAILED DESCRIPTION OF THE INVENTION

The Optical Solar Reflector (OSR) of the present invention is adapted to form the exterior surface or coating of a satellite or other space vehicle for the purpose of providing temperature control. The OSR is bonded in tile-like fashion to the exterior skin of a satellite, where it is effective to radiate heat which is generated within the satellite, as for example, by electronic equipment, while at the same time reflecting incident solar radiation to which the satellite is subjected when in a space environment. The size of the tiles depends upon the requirements of their installation, the range from 0.5 inch square up to about 4 inches square covering most installations. The tiles are attached to the exterior skin of the satellite using a high temperature, low outgassing adhesive, preferably one which has at least some flexibility to allow for possible differences in thermal expansion between the OSR and the skin of the satellite.

Referring now to the drawing, the OSR of the present invention, designated generally by the reference numeral 10, comprises a substrate layer 12 of silicon nitride ($Si_3N_4$), preferably crystalline silicon nitride, with a reflecting metallic layer 14 applied to its rear surface. Optionally, a protective antitarnishing layer 16 of chromium, Inconel or alumina may be applied to the outside of the reflective layer 14. Thus, according to one embodiment of this invention the OSR 10 comprises substrate layer 12, reflecting layer 14 and the optional protective layer 16. According to another embodiment of the invention, the OSR 10 further comprises a front surface dielectric coating 18 consisting of a plurality of alternating layers of thorium fluoride 20 and zinc sulfide 22. In a presently preferred embodiment, the coating 18 consists of a total of six of the alternating layers.

The silicon nitride layer 12 exhibits a sharp reflectance peak in the 9 to 11 micron region, while the visible transmission of such material can, in general, be made better than 80%. Fabrication of the silicon nitride tiles is by chemical vapor deposition onto a suitable target, such as graphite. Following deposition, the deposit is cut into suitably sized tiles, then lapped to a desired thickness of about 200 to 300 microns and polished to maximize the visible transmission and improve the IR reflectivity. Prior to depositing the reflective layer 14 onto the substrate 12 an optional adhesion promoting layer 24 of alumina may be vacuum deposited onto substrate 12. The layer 24 has a thickness of about 100–200 Angstroms. The reflecting layer 14 may then be vacuum deposited. This layer can be aluminum, silver, gold or the like. The protective layer 16 and the optional front surface coating 18 are thereafter applied to the OSR.

Various modifications of the present invention are possible in light of the above disclosure without departing from the spirit thereof or the scope of the appended claims.

We claim:

1. A thermal device adapted for use as the exterior coating of a space vehicle comprising a silicon nitride tile having a front surface dielectric coating, a reflecting metallic coating applied to the rear surface thereof, and a protective layer outboard of said metallic coating.

2. The thermal device of claim 1 wherein said metallic coating is silver.

3. The thermal device of claim 1 wherein said silicon nitride has a thickness in the approximate range of 200 to 300 microns.

4. The thermal device of claim 1 additionally comprising a layer of alumina-deposited between said silicon nitride and said metallic coating.

5. The thermal device of claim 1 wherein said front surface coating consists of a plurality of alternating layers of thorium fluoride and zinc sulfide.

* * * * *